United States Patent
Doering et al.

(10) Patent No.: US 9,545,908 B2
(45) Date of Patent: Jan. 17, 2017

(54) CLUTCH STROKE ADAPTATION ON ENGINE SHUTDOWN

(71) Applicant: FORD GLOBAL TECHNOLOGIES, LLC, Dearborn, MI (US)

(72) Inventors: Jeffrey Allen Doering, Canton, MI (US); Adam Nathan Banker, Canton, MI (US); Dennis Craig Reed, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 14/242,064

(22) Filed: Apr. 1, 2014

(65) Prior Publication Data
US 2015/0274146 A1 Oct. 1, 2015

(51) Int. Cl.
| | |
|---|---|
| *B60W 10/02* | (2006.01) |
| *B60W 10/06* | (2006.01) |
| *B60W 10/08* | (2006.01) |
| *B60W 10/10* | (2012.01) |
| *B60K 6/387* | (2007.10) |
| *B60W 20/00* | (2016.01) |
| *B60K 6/48* | (2007.10) |
| *B60W 50/00* | (2006.01) |

(52) U.S. Cl.
CPC ............ *B60W 10/02* (2013.01); *B60K 6/387* (2013.01); *B60W 10/06* (2013.01); *B60W 10/08* (2013.01); *B60W 10/10* (2013.01); *B60W 20/40* (2013.01); *B60K 2006/4825* (2013.01); *B60W 2050/0088* (2013.01); *B60W 2050/0089* (2013.01); *B60W 2510/06* (2013.01); *B60W 2510/0676* (2013.01); *B60W 2510/107* (2013.01); *B60W 2710/02* (2013.01); *B60W 2710/022* (2013.01); *B60W 2710/023* (2013.01); *B60W 2710/10* (2013.01); *Y02T 10/6252* (2013.01); *Y10T 477/26* (2015.01); *Y10T 477/641* (2015.01)

(58) Field of Classification Search
None
See application file for complete search history.

(56) References Cited

U.S. PATENT DOCUMENTS

| | | | |
|---|---|---|---|
| 4,526,065 A * | 7/1985 | Rosen | F16H 61/0267 477/100 |
| 8,414,449 B2 | 4/2013 | Heap et al. | |
| 8,538,643 B1 | 9/2013 | Wang et al. | |
| 2012/0083952 A1 | 4/2012 | Smith et al. | |
| 2013/0178330 A1 | 7/2013 | Nefcy et al. | |
| 2013/0211653 A1* | 8/2013 | Matsui | F02D 41/123 701/22 |
| 2013/0274969 A1 | 10/2013 | Wang et al. | |
| 2013/0296108 A1 | 11/2013 | Ortmann et al. | |
| 2013/0296109 A1 | 11/2013 | Nedorezov et al. | |
| 2013/0296123 A1 | 11/2013 | Doering et al. | |
| 2013/0296132 A1 | 11/2013 | Doering et al. | |
| 2013/0296136 A1 | 11/2013 | Doering et al. | |

(Continued)

FOREIGN PATENT DOCUMENTS

CN 101531197 A 9/2009

*Primary Examiner* — Justin Holmes
(74) *Attorney, Agent, or Firm* — Carlson, Gaskey & Olds

(57) ABSTRACT

A method according to an exemplary aspect of the present disclosure includes, among other things, controlling a transmission system of a vehicle by positioning a disconnect clutch at its stroke point in response to a commanded engine shutdown.

17 Claims, 4 Drawing Sheets

(56) References Cited

U.S. PATENT DOCUMENTS

| | | | |
|---|---|---|---|
| 2013/0297105 A1 | 11/2013 | Yamazaki et al. | |
| 2013/0297113 A1 | 11/2013 | Banker et al. | |
| 2013/0304293 A1* | 11/2013 | Yoshikawa | B60K 6/48 701/22 |
| 2014/0088842 A1* | 3/2014 | Otanez | B60W 10/115 701/53 |

* cited by examiner

CLUTCH STROKE ADAPTATION ON ENGINE SHUTDOWN

TECHNICAL FIELD

This disclosure relates to a hybrid electric vehicle, and more particularly, but not exclusively, to a hybrid electric vehicle transmission system and method for adapting disconnect clutch stroke torque on engine shutdown.

BACKGROUND

Hybrid electric vehicles (HEV's) employ both an internal combustion engine and an electric machine that can be used either individually or in combination to propel the vehicle. A variety of different powertrains may be utilized by HEV's. One type of powertrain is referred to as a modular hybrid transmission (MHT). MHT's include a parallel configuration in which the engine is connected to the electric machine by a disconnect clutch and the electric machine drives a torque converter input of a transmission. The transmission has an output connected to a differential that is coupled to the drive wheels of the vehicle.

The engine may be started independently of the electric machine in a MHT. Once the engine is up to speed, the disconnect clutch may be commanded to engage to allow the engine to deliver torque to the transmission. Timing the engagement of the disconnect clutch is important for start performance of the engine.

SUMMARY

A method according to an exemplary aspect of the present disclosure includes, among other things, controlling a transmission system of a vehicle by positioning a disconnect clutch at its stroke point in response to a commanded engine shutdown.

In a further non-limiting embodiment of the foregoing method, the transmission system is a modular hybrid transmission that includes an engine, an electric machine and a disconnect clutch that selectively couples the engine to the electric machine.

In a further non-limiting embodiment of either of the foregoing methods, the positioning step is performed only if at least one of an engine temperature and a transmission temperature falls within a predefined temperature range.

In a further non-limiting embodiment of any of the foregoing methods, the method includes collecting engine deceleration rates and engine torque estimates in response to each of a plurality of commanded engine shutdowns.

In a further non-limiting embodiment of any of the foregoing methods, the collecting step is performed if an absolute value of a clutch slip of the disconnect clutch exceeds a predefined threshold.

In a further non-limiting embodiment of any of the foregoing methods, the method includes deriving engine torque errors from the engine deceleration rates and the engine torque estimates collected during the plurality of commanded engine shutdowns.

In a further non-limiting embodiment of any of the foregoing methods, the method includes calculating average engine torque errors for both positive clutch slip events and negative clutch slip events of the disconnect clutch.

In a further non-limiting embodiment of any of the foregoing methods, the method includes calculating an actual clutch capacity of the disconnect clutch based on a difference in the average engine torque error associated with the positive clutch slip events and the average engine torque error associated with the negative clutch slip events.

In a further non-limiting embodiment of any of the foregoing methods, the method includes updating stroke information of the disconnect clutch in response to a statistically significant difference between the average engine torque error associated with the positive clutch slip events and the average engine torque error associated with the negative clutch slip events.

In a further non-limiting embodiment of any of the foregoing methods, the updating step includes adapting a clutch transfer function.

A method according to another exemplary aspect of the present disclosure includes, among other things, controlling a transmission system of a vehicle by adapting stroke information associated with a disconnect clutch based on engine deceleration rates and engine torque estimates.

In a further non-limiting embodiment of the foregoing method, the engine deceleration rates and the engine torque estimates are collected over multiple commanded engine shutdowns.

In a further non-limiting embodiment of either of the foregoing methods, the method includes commanding the disconnect clutch to a stroke point at each commanded engine shutdown, recording the engine deceleration rates and the engine torque estimates associated with each of a plurality of commanded engine shutdowns, calculating an engine torque error for positive clutch slip events based on the engine deceleration rates and the engine torque estimates, and calculating an engine torque error for negative clutch slip events based on the engine deceleration rates and the engine torque estimates.

In a further non-limiting embodiment of any of the foregoing methods, the method includes calculating an average engine torque error associated with the positive clutch slip events and calculating an average engine torque error associated with the negative clutch slip events.

In a further non-limiting embodiment of any of the foregoing methods, the method includes calculating an actual clutch capacity of the disconnect clutch based on a difference between the average engine torque error associated with the positive clutch slip events and the average engine torque error associated with the negative clutch slip events, and performing the adapting step in response to a statistically significant difference between the average engine torque error associated with the positive clutch slip events and the average engine torque error associated with the negative clutch slip events.

A transmission system according to another exemplary aspect of the present disclosure includes, among other things, an engine, an electric machine, a disconnect clutch that selectively couples the engine to the electric machine and a control unit configured to update stroke information of the disconnect clutch based on deceleration rates and torque estimates of the engine.

In a further non-limiting embodiment of the foregoing transmission system, the transmission system is a modular hybrid transmission.

In a further non-limiting embodiment of either of the foregoing transmission systems, the control unit is configured to collect the deceleration rates and the torque estimates over the course of a plurality of commanded engine shutdowns.

In a further non-limiting embodiment of any of the foregoing transmission systems, the control unit is configured to position the disconnect clutch at its stroke point in response to a commanded shutdown of the engine.

In a further non-limiting embodiment of any of the foregoing transmission systems, the control unit is configured to identify whether any capacity is being carried by the disconnect clutch.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a transmission system and method for a HEV. The transmission system may be controlled by positioning the disconnect clutch at its stroke point in response to an engine shutdown. The stroke point of the disconnect clutch may be adapted based on engine deceleration rates and engine torque estimates that are collected over multiple engine shutdowns. A clutch transfer function may be adapted to change the pressure and control commands required to stroke the disconnect clutch to its stroke point based on statistically significant differences between average engine torque errors associated with both positive clutch slip events and negative clutch slip events. These and other features are discussed in greater detail herein.

Figure 1:
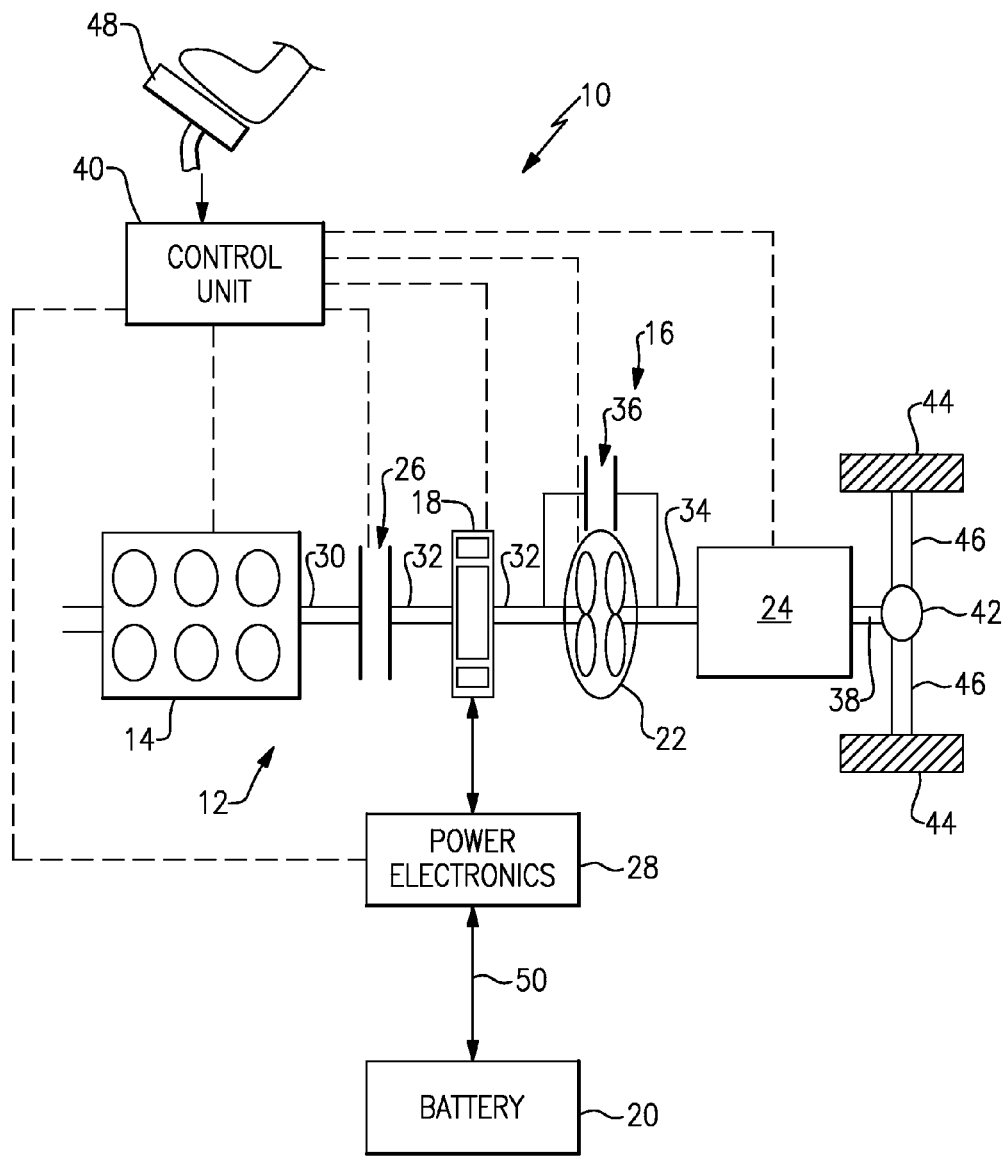
FIG. 1 schematically illustrates a powertrain of a hybrid electric vehicle.

FIG. 1 schematically illustrates a HEV 10. Although illustrated as a HEV, the present disclosure may be applicable to other types of electrified vehicles. In addition, although a specific component relationship is illustrated in FIG. 1, this illustration is not intended to be limiting on this disclosure. In other words, it should be readily understood that the placement and orientation of the various components of the HEV 10 could vary within the scope of this disclosure.

The exemplary HEV 10 includes a powertrain 12. The powertrain 12 includes an engine 14 and a transmission system 16 that is selectively driven by the engine 14. In one embodiment, the transmission system 16 is a modular hybrid transmission (MHT). The transmission system 16 can include an electric machine 18 powered by a battery 20, a torque converter 22 and a multiple-step ratio automatic transmission, or gearbox 24. In one embodiment, the electric machine 18 is configured as an electric motor. However, the electric machine 18 could alternatively be configured as a generator or a combined motor/generator within the scope of this disclosure.

The engine 14 and the electric machine 18 may both be employed as available drive sources for the HEV 10. The engine 14 generally represents a power source that may include an internal combustion engine such as a gasoline, diesel, or natural gas powered engine, or a fuel cell. The engine 14 generates power and corresponding torque that is supplied to the electric machine 18 when an engine disconnect clutch 26 that is disposed between the engine 14 and the electric machine 18 is engaged.

The electric machine 18 may be implemented by any one of a plurality of types of electric machines. By way of one non-limiting embodiment, the electric machine 18 could be a permanent magnet synchronous motor.

Power electronics 28 are configured to condition direct current (DC) power provided by the battery 20 to the requirements of the electric machine 18, as is discussed more particularly below. For example, the power electronics 28 may provide three-phase alternating current (AC) to the electric machine 18.

When the engine disconnect clutch 26 is at least partially engaged, power flow from the engine 14 to the electric machine 18 or from the electric machine 18 to the engine 14 is possible. For example, the engine disconnect clutch 26 may be engaged and the electric machine 18 may operate as a generator to convert rotational energy provided by a crankshaft 30 and an electric machine shaft 32 into electrical energy to be stored in the battery 20. The engine disconnect clutch 26 can also be disengaged to isolate the engine 14 from the remainder of the powertrain 12 such that the electric machine 18 can act as the sole power source for propelling the HEV 10.

The electric machine shaft 32 may extend through the electric machine 18. The electric machine 18 is continuously drivably connected to the electric machine shaft 32, whereas the engine 14 is drivably connected to the electric machine shaft 32 only when the engine disconnect clutch 26 is at least partially engaged.

The electric machine 18 is connected to the torque converter 22 via the electric machine shaft 32. The torque converter 22 is therefore connected to the engine 14 when the engine disconnect clutch 26 is at least partially engaged. The torque converter 22 includes an impeller fixed to the electric machine shaft 32 and a turbine fixed to a transmission input shaft 34. The torque converter 22 thus provides a hydraulic coupling between the electric machine shaft 32 and the transmission input shaft 34.

The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 36 may also be provided. When engaged, the torque converter bypass clutch 36 frictionally or mechanically couples the impeller and the turbine of the torque converter 22 to enable a more efficient power transfer. The torque converter bypass clutch 36 may be operated as a launch clutch to provide smooth vehicle launch. Alternatively, or in combination, a launch clutch similar to the engine disconnect clutch 26 may be provided between the electric machine 18 and the transmission gearbox 24 for applications that do not include a torque converter 22 or a torque converter bypass clutch 36. In some embodiments, the engine disconnect clutch 26 is generally referred to as an upstream clutch and the torque converter bypass clutch 36 (which may be a launch clutch) is generally referred to as a downstream clutch.

The transmission gearbox 24 may include gear sets (not shown) that are selectively operated using different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The transmission gearbox 24 may be automatically shifted from one ratio to another based on various vehicle and ambient operating conditions by an associated controller. The transmission gearbox 24 then provides powertrain output torque to the transmission output shaft 38.

It should be understood that the hydraulically controlled transmission gearbox 24 used with a torque converter 22 is but one non-limiting embodiment of a gearbox or transmission arrangement and that any multiple ratio gearbox that accepts input torque(s) from an engine and/or a motor and then provides torque to an output shaft at the different ratios is acceptable for use with the embodiments of this disclosure. For example, the transmission gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

The transmission output shaft 38 may be connected to a differential 42. The differential 42 drives a pair of wheels 44 via respective axles 46 that are connected to the differential 42. In one embodiment, the differential 42 transmits approximately equal torque to each wheel 44 while permitting slight speed differences such as when the vehicle turns a corner. Different types of differentials or similar devices may be used to distribute torque from the powertrain 12 to one or more wheels 44. In some applications, torque distribution may vary depending on the particular operating mode or condition, for example.

The powertrain 12 may additionally include an associated control unit 40. While schematically illustrated as a single controller, the control unit 40 may be part of a larger control system and may be controlled by various other controllers throughout the HEV 10, such as a vehicle system controller (VSC) that includes a powertrain control unit, a transmission control unit, an engine control unit, etc. It should therefore be understood that the control unit 40 and one or more other controllers can collectively be referred to as a "control unit" that controls, such as through a plurality of interrelated algorithms, various actuators in response to signals from various sensors to control functions such as starting/stopping the engine 14, operating the electric machine 18 to provide wheel torque or charge the battery 20, select or schedule transmission shifts, stroke the disconnect clutch 26, etc. In one embodiment, the various controllers that make up the VSC may communicate with one another using a common bus protocol (e.g., CAN).

The control unit 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The control unit 40 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 1, the control unit 40 may communicate signals to and/or from the engine 14, the engine disconnect clutch 26, the electric machine 18, the torque converter bypass clutch 36, the transmission gearbox 24, and the power electronics 28. Although not explicitly illustrated, those of ordinary skill in the art will recognize various functions or components that may be controlled by the control unit within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for engine disconnect clutch 26, torque converter bypass clutch 36, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 36 status (TCC), deceleration or shift mode, for example.

Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 48 may be used by the driver of the HEV 10 to provide a demanded torque, power, or drive command to propel the HEV 10. In general, depressing and releasing the pedal 48 generates an accelerator pedal position signal that may be interpreted by the control unit 40 as a demand for increased power or decreased power, respectively. Based at least upon input from the pedal 48, the control unit 40 commands torque from the engine 14 and/or the electric machine 18. The control unit 40 also controls the timing of gear shifts within the transmission gearbox 24, as well as engagement or disengagement of the engine disconnect clutch 26 and the torque converter bypass clutch 36. Like the engine disconnect clutch 26, the torque converter bypass clutch 36 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 36 may be operated as locked or open without using a modulated operating mode depending on the particular application.

To drive the HEV 10 with the engine 14, the engine disconnect clutch 26 is at least partially engaged to transfer at least a portion of the engine torque through the engine disconnect clutch 26 to the electric machine 18, and then from the electric machine 18 through the torque converter 22 and the transmission gearbox 24. The electric machine 18 may assist the engine 14 by providing additional power to turn the electric machine shaft 32. This operation mode may be referred to as a "hybrid mode" or an "electric assist mode."

To drive the HEV 10 using the electric machine 18 as the sole power source, the power flow remains the same except the engine disconnect clutch 26 isolates the engine 14 from the remainder of the powertrain 12. Combustion in the engine 14 may be disabled or otherwise turned OFF during this time to conserve fuel. The battery 20 transmits stored electrical energy through wiring 50 to the power electronics 28, which may include an inverter, for example. The power electronics 28 convert DC voltage from the battery 20 into AC voltage to be used by the electric machine 18. The control unit 40 commands the power electronics 28 to convert voltage from the battery 20 to an AC voltage provided to the electric machine 18 to provide positive or negative torque to the electric machine shaft 32. This operation mode may be referred to as an "electric only" or "EV" operation mode.

In any mode of operation, the electric machine 18 may act as a motor and provide a driving force for the powertrain 12. Alternatively, the electric machine 18 could act as a generator and convert kinetic energy from the HEV 10 into electric energy to be stored in the battery 20. The electric machine 18 may act as a generator while the engine 14 is providing propulsion power for the HEV 10, for example. The electric machine 18 may additionally act as a generator during times of regenerative braking in which rotational energy from spinning the wheels 44 is transferred back through the transmission gearbox 24 and is converted into electrical energy for storage in the battery 20.

It should be understood that highly schematic depiction of FIG. 1 is merely exemplary and is not intended to be limiting on this disclosure. Other configurations are additionally or alternatively contemplated that utilize selective engagement of both an engine and a motor to transmit through the transmission. For example, the electric machine 18 may be offset from the crankshaft 30 or an additional motor may be provided to start the engine 14. Other configurations are contemplated without departing from the scope of this disclosure.

Figure 2:
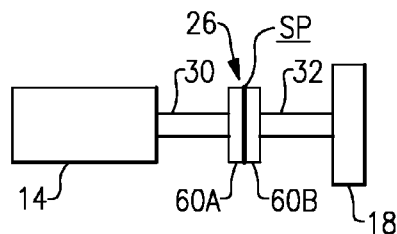
FIG. 2 illustrates a stroke point of a disconnect clutch.

Referring to FIG. 2, the disconnect clutch 26 may include a pair of clutch plates 60A, 60B. The clutch plate 60A is connected to the crankshaft 30 of the engine 14 and the clutch plate 60B is connected to the electric machine shaft 32 of the electric machine 18. The clutch plates 60A, 60B may engage/disengage from one another in order to connect the engine 14 to the electric machine 18 (or vice versa).

In one embodiment, the disconnect clutch 26 may be positioned at its stroke point SP in response to a shutdown of the engine 14. The stroke point SP of the disconnect clutch 26 is a position in which the clutch plates 60A and 60B just begin to touch one another (i.e., are stroked), yet carry little if any capacity from either the engine 14 or the electric machine 18. Therefore, the clutch capacity (i.e., the amount of torque that can be transmitted) of the disconnect clutch 26 should be near zero when positioned at the stroke point SP.

Knowing how to control the disconnect clutch 26 to position it at its stroke point SP is important for start performance of the engine 14. The pressure and control commands required to position the disconnect clutch 26 at its stroke point SP may vary part-to-part and may change over time. Stroke variation of the disconnect clutch 26 can negatively impact clutch wear/durability and engine start performance. Accordingly, an exemplary method to adapt the stroke torque of the disconnect clutch 26 to compensate for this variability is described in detail below.

Figure 3:
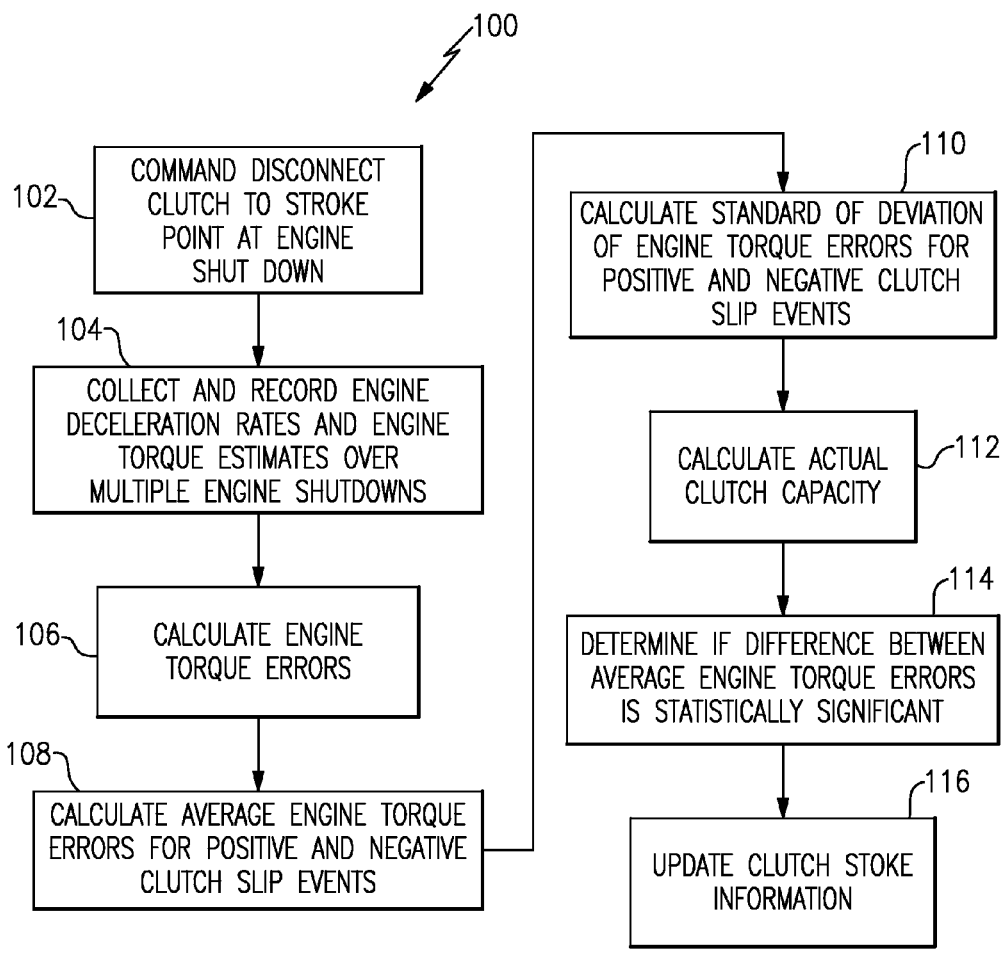
FIG. 3 schematically illustrates a method of controlling a transmission system.

FIG. 3, with continued reference to FIGS. 1 and 2, schematically illustrates a method 100 for adapting stroke information of the disconnect clutch 26 to compensate for part-to-part and change-over-time variability. Among other information, the stroke information may include the amount of pressure and control signals required to position the disconnect clutch 26 at its stroke point SP.

The method may begin at block 102 by commanding the disconnect clutch 26 to its stroke point SP in response to each engine 14 shutdown. In other words, at each shutdown of the engine 14, the disconnect clutch 26 may be commanded to a constant capacity by positioning the clutch plates 60A and 60B in direct contact with one another. In one non-limiting embodiment, performance of block 102 may be limited to engine 14 shutdowns where the engine 14 and the transmission system 16 temperatures are within predefined temperature ranges.

Next, at block 104, engine deceleration rates and engine torque estimates are collected and recorded over multiple engine 14 shutdowns. The engine deceleration rates and engine torque estimates may be collected and recorded for any number of engine 14 shutdowns. The engine torque estimate may be estimated by the control unit 40 and could be based on engine coolant temperatures, engine oil temperatures, friction, pumping, accessory torques, and/or numerous other factors.

The engine deceleration rates may be derived using the following equation:

$$\alpha = (N_1 - N_2)/(T_1 - T_2) \tag{1}$$

where:
N is engine speed; and
T is time.

Figure 4:
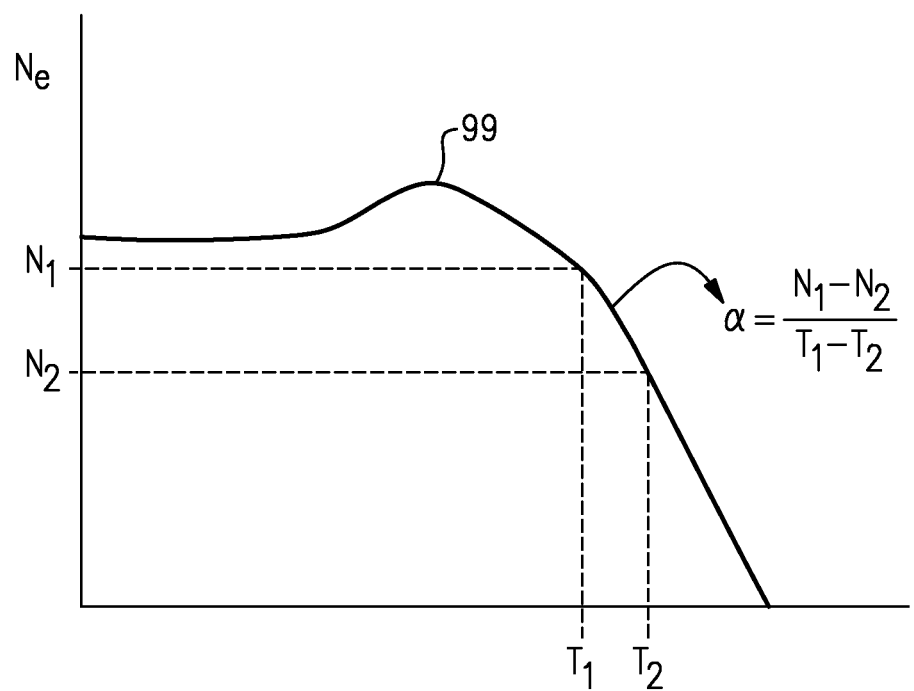
FIG. 4 is a graphical representation of an engine speed plot that can be used to observe engine deceleration rates.

In one embodiment, each engine deceleration rate α is calculated over a predetermined engine 14 speed window (shown graphically in FIG. 4, which plots engine speed $N_e$ versus time T). Each engine deceleration rate α may be derived from an engine speed plot 99 (see FIG. 4) and can be expressed using the above equation (1).

In one non-limiting embodiment, the engine deceleration rates α and the engine torque estimates $T_e$ are calculated/estimated and recorded only where an absolute value of clutch slip of the disconnect clutch 26 exceeds a predefined threshold. Clutch slip may occur across the disconnect clutch 26 where there is a difference between the speed of the engine 14 and the speed of the electric machine 18. Multiple measurements of the engine deceleration rate α and the engine torque estimate $T_e$ may be recorded for situations where the engine speed is above and below the speed of the electric machine 18.

An engine torque error $T_{error}$ may be calculated at block 106. The engine torque error $T_{error}$ may be derived from the engine deceleration rate α and the engine torque estimate $T_e$. For example, the engine torque error $T_{error}$ can be expressed using the following equation:

$$T_{error}=T_e-I\alpha \qquad (2)$$

Engine torque errors $T_{error}$ are calculated for both positive clutch slip events and negative clutch slip events based on the engine deceleration rates α and the engine torque estimates $T_e$. Positive clutch slip events occur where the speed of the engine 14 exceeds the speed of the electric machine 18 such that the electric machine 18 will drag the speed of the engine 14 down. Negative clutch slip events occur where the speed of the electric machine 18 exceeds the speed of the engine 14 such that the electric machine 18 will keep the engine 14 spinning if the disconnect clutch 26 is dragging.

Once a predefined threshold number of engine torque errors $T_{error}$ for both positive clutch slip events and negative clutch slip events have been recorded in the memory of the control unit 40 in response to multiple engine 14 shutdowns, an average engine torque error $\overline{T}_p$ associated with the positive clutch slip events and an average engine torque error $\overline{T}_n$ associated with the negative clutch slip events may be calculated at block 108. In addition, a standard of deviation of the engine torque errors associated with the positive clutch slip events and a standard of deviation of the engine torque errors associated with the negative clutch slip events may be calculated at block 110.

Next, at block 112, an actual clutch capacity $T_{cap}$ of the disconnect clutch 26 is calculated. The actual clutch capacity $T_{cap}$ may be calculated based on a difference between the average engine torque error $\overline{T}_p$ associated with the positive clutch slip events and the average engine torque error $\overline{T}_n$ associated with the negative clutch slip events as illustrated by the following equation:

$$T_{cap}=\overline{T}_p-\overline{T}_n \qquad (3)$$

A determination as to whether the difference between the average engine torque errors $\overline{T}_p$ associated with the positive clutch slip events and the average engine torque errors $\overline{T}_n$ associated with the negative clutch slip events is a statistically significant difference can be made at block 114. In one embodiment, this determination is made using the standards of deviation calculated at block 110. A statistically significant difference in engine deceleration rates based on a sign of slip across the disconnect clutch 26 indicates that the disconnect clutch 26 is carrying capacity at its stroke point SP and therefore requires adaptation.

Finally, at block 116, if a statistically significant difference is determined at block 114, the transmission system 16 is controlled by adapting or updating the stroke information of the disconnect clutch 26. For example, the pressure and control signals required to position the disconnect clutch 26 at its stroke point SP may be updated for positioning the disconnect clutch 26 at its stroke point SP during later engine 14 shutdowns.

The control unit 40 may be programmed to employ one or more algorithms in order to perform the exemplary method 100. In one non-limiting embodiment, the above equations may be programmed into the control unit 40 for updating the stroke information (i.e., the amount of pressure and required control signals) related to the stroke point SP of the disconnect clutch 26. For example, the above equations may be used to adapt a clutch transfer function programmed within the control unit 40 for future control of the disconnect clutch 26. The clutch transfer function relates pressure or actuator positions to capacity of the disconnect clutch 26, in one embodiment.

Figure 5A:
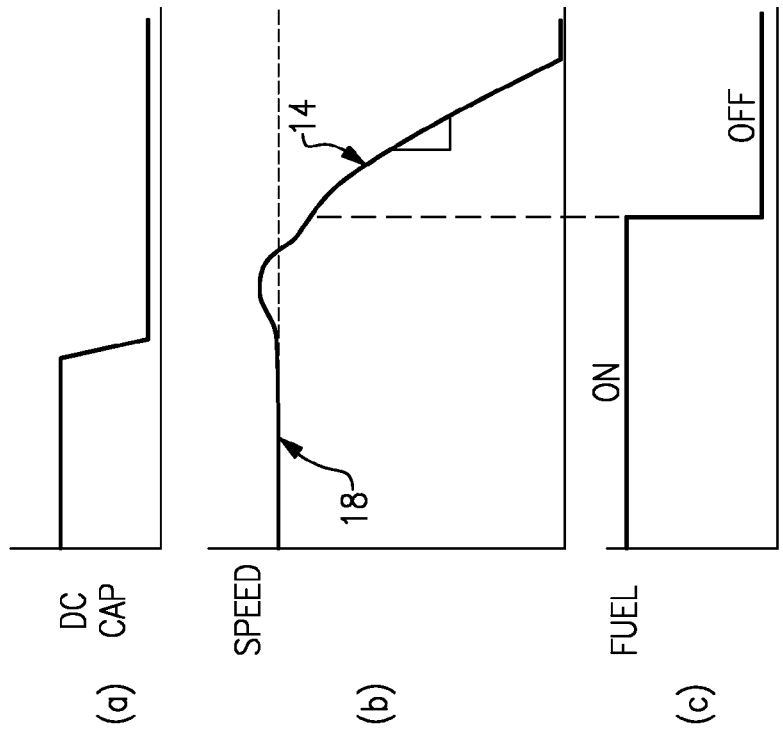
FIGS. 5A and 5B graphically illustrate comparisons of engine deceleration rates for both positive clutch slip events (FIG. 5A) and negative clutch slip events (FIG. 5B) at engine shutdowns.
Figure 5B:
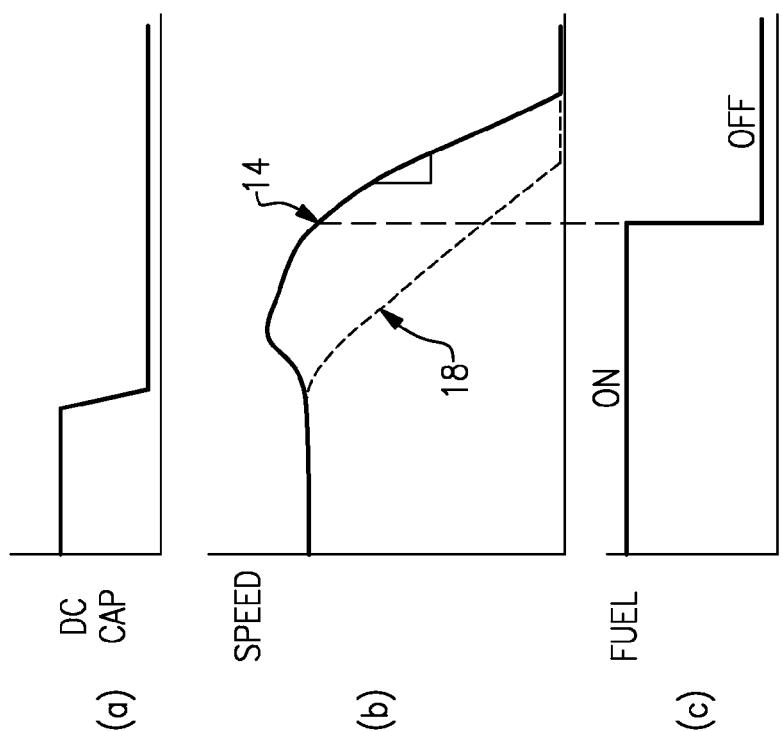

FIGS. 5A and 5B schematically illustrate portions of the method 100, which can be used to identify whether any capacity is being carried by the disconnect clutch 26 when positioned at its stoke point SP. Each of FIGS. 5A and 5B include a plot (a) of the disconnect clutch 26 capacity, a plot (b) that compares engine 14 and electric machine 18 speeds for both positive clutch slip events (see FIG. 5A) and negative clutch slip events (FIG. 5B), and a plot (c) of engine 14 fuel ON or OFF.

As shown in plot (b) of FIG. 5A, the engine 14 speed exceeds the electric machine 18 speed and indicates a positive clutch slip event of the disconnect clutch 26. Similarly, as shown in plot (b) of FIG. 5B, the electric machine 18 speed exceeds the speed of the engine 14 and indicates a negative clutch slip event of the disconnect clutch 26. A statistically significant difference in the deceleration rates of the engine 14 during both the positive clutch slip event and the negative clutch slip event indicates that the disconnect clutch 26 is carrying capacity while being stroked to its stroke point SP on engine 14 shutdowns. The stroke torque of the disconnect clutch 26 may therefore be adapted to compensate for part-to-part and change-over-time variability.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. A method, comprising:
   controlling a transmission system of a vehicle by positioning a disconnect clutch at its stroke point in response to a commanded engine shutdown;
   collecting engine deceleration rates and engine torque estimates in response to each of a plurality of commanded engine shutdowns; and
   deriving engine torque errors from the engine deceleration rates and the engine torque estimates collected during the plurality of commanded engine shutdowns.
2. The method as recited in claim 1, wherein the transmission system is a modular hybrid transmission that includes an engine, an electric machine and a disconnect clutch that selectively couples the engine to the electric machine.

3. The method as recited in claim 1, wherein the positioning step is performed only if at least one of an engine temperature and a transmission temperature falls within a predefined temperature range.

4. The method as recited in claim 1, wherein the collecting step is performed if an absolute value of a clutch slip of the disconnect clutch exceeds a predefined threshold.

5. The method as recited in claim 1, comprising calculating average engine torque errors for both positive clutch slip events and negative clutch slip events of the disconnect clutch.

6. The method as recited in claim 5, comprising calculating an actual clutch capacity of the disconnect clutch based on a difference in the average engine torque error associated with the positive clutch slip events and the average engine torque error associated with the negative clutch slip events.

7. The method as recited in claim 6, comprising updating stroke information of the disconnect clutch in response to a statistically significant difference between the average engine torque error associated with the positive clutch slip events and the average engine torque error associated with the negative clutch slip events.

8. The method as recited in claim 7, wherein the updating step includes adapting a clutch transfer function.

9. The method as recited in claim 1, wherein the stroke point is a position at which clutch plates of the disconnect clutch begin to touch one another yet carry a negligible amount of capacity from either an engine or an electric machine of the vehicle.

10. A method, comprising:
controlling a transmission system of a vehicle by adapting stroke information associated with a disconnect clutch based on engine deceleration rates and engine torque estimates;
commanding the disconnect clutch to a stroke point at each commanded engine shutdown;
recording the engine deceleration rates and the engine torque estimates associated with each of a plurality of commanded engine shutdowns;
calculating an engine torque error for positive clutch slip events based on the engine deceleration rates and the engine torque estimates; and
calculating an engine torque error for negative clutch slip events based on the engine deceleration rates and the engine torque estimates.

11. A method, comprising:
controlling a transmission system of a vehicle by adapting stroke information associated with a disconnect clutch based on engine deceleration rates and engine torque estimates, wherein the engine deceleration rates and the engine torque estimates are collected over multiple commanded engine shutdowns.

12. The method as recited in claim 10, comprising:
calculating an average engine torque error associated with the positive clutch slip events; and
calculating an average engine torque error associated with the negative clutch slip events.

13. The method as recited in claim 12, comprising:
calculating an actual clutch capacity of the disconnect clutch based on a difference between the average engine torque error associated with the positive clutch slip events and the average engine torque error associated with the negative clutch slip events; and
performing the adapting step in response to a statistically significant difference between the average engine torque error associated with the positive clutch slip events and the average engine torque error associated with the negative clutch slip events.

14. A transmission system, comprising:
an engine;
an electric machine;
a disconnect clutch that selectively couples said engine to said electric machine; and
a control unit configured to update stroke information of said disconnect clutch based on deceleration rates and torque estimates of said engine and configured to collect said deceleration rates and said torque estimates over the course of a plurality of commanded engine shutdowns.

15. The transmission system as recited in claim 14, wherein said transmission system is a modular hybrid transmission.

16. The transmission system as recited in claim 14, wherein said control unit is configured to position said disconnect clutch at its stroke point in response to a commanded shutdown of said engine.

17. The transmission system as recited in claim 14, wherein said control unit is configured to identify whether any capacity is being carried by said disconnect clutch.

* * * * *